United States Patent [19]

Werner

[11] Patent Number: 4,753,070
[45] Date of Patent: Jun. 28, 1988

[54] APPARATUS UTILIZED IN GENERATING POWER AND METHOD FOR REVOLVING A PLURALITY OF VANES TO GENERATE POWER

[76] Inventor: Peter L. Werner, P.O. Box 16562, Wichita, Kans. 67216

[21] Appl. No.: 877,139

[22] Filed: Jun. 23, 1986

Related U.S. Application Data

[63] Continuation-in-part of Ser. No. 747,820, Jun. 24, 1985, abandoned.

[51] Int. Cl.$^4$ ............................................. F16D 31/00
[52] U.S. Cl. ..................................................... 60/325
[58] Field of Search ............. 60/325, 398, 327, 39.57, 60/496; 417/52, 327, 313, 150, 334–336; 415/202, DIG. 2; 290/43, 54; 405/75, 78

[56] References Cited

U.S. PATENT DOCUMENTS

| | | | |
|---|---|---|---|
| 3,715,885 | 2/1973 | Schur | 60/496 |
| 3,939,356 | 2/1976 | Loane | 60/398 X |
| 4,086,775 | 5/1978 | Peterson | 60/398 X |
| 4,211,076 | 7/1980 | Grande | 60/398 |

*Primary Examiner*—Edward K. Look
*Attorney, Agent, or Firm*—J. Carpenter

[57] ABSTRACT

An apparatus utilized in generating power for use comprising a base foundation, a generally cylindrical container with a vent opening, and a top and bottom having a facial plane that is angularly disposed with respect to a horizontal plane. A fluid is in the container, and a shaft in concentrically rotatably disposed in the cylindrical container and extends either through the top or through the bottom. A generally cylindrical turbine is rotatably bound to the shaft within the fluid. The turbine has a cap top and cap side that attaches to the turbine sleeve. Compressed gas is introduced at, to and/or through the container bottom in order for the turbine to rotate the shaft when compressed gas produces a buoyant force against the turbine. A method for revolving a plurality of vanes as a result of buoyancy force produced by compressed gas against the vanes of a turbine.

62 Claims, 9 Drawing Sheets

APPARATUS UTILIZED IN GENERATING POWER AND METHOD FOR REVOLVING A PLURALITY OF VANES TO GENERATE POWER

BACKGROUND OF THE INVENTION

This is a continuation-in-part application of my copending application having Ser. No. 747,820 and filed on June 24, 1985 now abandoned.

1. Field of the Invention

This invention is related to an apparatus utilized in generating power. More specifically, this invention provides an apparatus having a turbine, or the like, in a fluid means for generating power, and a method for revolving the vanes of a turbine means in a fluid means within a container, a reservoir means, or the like. The method utilizes the buoyant force of upwardly moving bubbles of gas means, which is transferred to the vanes of the turbine means causing it to rotate.

2. Description of the Prior Art

U.S. Pat. No. 4,211,076 to Grande discloses a water driven compressor wherein the compressor may trap and compress air, and release the compressed air to a reservoir from which the air may be released against a turbine operating a generator. U.S. Pat. No. 3,939,356 to Loane teaches a liquid gas generating system wherein water from a reservoir may flow into a subterranean chamber compressing air and driving a generator. The compressed air may be used for operating the generator as well as the liquid. U.S. Pat. No. 4,248,043 to Stewart, Jr. discloses a generating system wherein water drive means compresses air, stores the same, and directs the stored compressed air against turbines to drive a generator to generate electricity. U.S. Pat. No. 3,715,885 to Schur teaches a heat engine of the type employing a liquid with a low boiling point as a working fluid and utilizing the vaporized liquid to generate mechanical power. U.S. Pat. No. 3,939,356 by Loane discloses a system for the generation of electricity by a combination of water and compressed air storage system. U.S. Pat. No. 4,086,775 by Peterson relates to the generation of power (more particularly electrical power) utilizing the wave action developed in a large body of water. U.S. Pat. No. 4,211,076 to Grande relates to means and methods of converting available sources of energy (i.e. those found in oceans and in rivers) to practical usable forms. None of the foregoing prior art patents teach or suggest the particular apparatus and methods of this invention.

SUMMARY OF THE INVENTION

The present invention accomplishes its desired objects by broadly providing an apparatus utilized in generating power for use comprising a base foundation means; and a generally cylindrical container means having a container bottom and a fluid means contained therein. A shaft means is generally concentrically, rotatably disposed in the cylindrical container means. A generally cylindrical turbine means is bound to said shaft means and is rotatably within said container means having the fluid means. The turbine means comprises a plurality of fin means and a turbine top that is bound circumferentially to the shaft means. The turbine top is angularly disposed with respect to a horizontal plane and forms a seal with the top of each of the plurality of fin means. The cylindrical turbine means additionally comprises a turbine side integrally bound to the turbine top and spacedly positioned away from the side of the cylindrical container means and connects with and forms a seal with the side of each of the plurality of fin means such that any given pair of fin means having its tops and sides respectively bound to the turbine top and turbine side defines a turbine compartment. The apparatus additionally includes a means for introducing compressed gas means to and/or through the container bottom in proximity to the lowest point of the turbine means with respect to a horizontal plane in order for the turbine means to rotate the shaft means when the compressed gas means produces a bouyancy force against the plurality of fin means and expands thereagainst as it rises from buoyancy to the surface of the fluid means, causing the plurality of fin means to rotate with the expansion and buoyancy of the compressed gas means.

The present invention also accomplishes its desired objects by broadly providing a method for revolving from a lower elevation to a higher elevation in a fluid means within a container means a plurality of fin means connected to a shaft means having a longitudinal axis that is less than normal with respect to a horizontal plane. Any given pair of fin means has a leading fin and a trailing fin and the trailing fin of one given pair of fin means defines the leading fin of an immediate subsequent pair of fin means with respect to when the plurality of fin means rotate. The method comprises the steps of:

(a) enclosing the plurality of fin means underneath a cap means having a cap top and a cap side by attaching to the cap top the top of each of the plurality of fin means and attaching to the cap side the side of each of the plurality of fin means such that any given pair of fin means having its tops and sides respectively bound to the top and side of the cap means defines a fin compartment;

(b) introducing compressed gas means into the fluid means in proximity to the lowest elevation of the plurality of fin means such that the compressed gas means produces a bouyancy force against the leading fin of the fin compartments in proximity to the lowest elevation as the compresssed gas means expands against the leading fin in rising from buoyancy to the surface of the fluid means; and (c) venting the compressed gas means, that has evolved from the surface of the fluid means in each fin compartment, from each fin compartment in order not to restrict or stop rotation of the revolving plurality of fin means in their downward path from the highest elevation to the lowest elevation.

The present invention yet further accomplishes its desired objects by broadly providing a method utilized in recovering energy by revolving from a lower elevation to a higher elevation in a fluid means within a container means a plurality of fin means connected to a sleeve means bound to a shaft means that is generally normal with respect to the facial plane of the top and bottom of the container means and having a longitudinal axis that is less than normal with respect to a horizontal plane. The method comprises the steps of:

(a) enclosing the plurality of fin means underneath a turbine cap means having a turbine cap top and a turbine cap side by attaching to the turbine cap top the top of each of the plurality of fin means and attaching to the turbine cap side the side of each of the plurality of fin means such that any given pair of fin means having its top and sides respectively bound to the top and side of the turbine cap means defines a turbine compartment with a leading fin and a trailing fin when the plurality of fin means rotate, the trailing fin of one given pair of fin means defines the leading fin of an immediate subsequent pair of fin means with respect to when the plurality of fin means rotate;

(b) mounting an electric generator means to and around said shaft means extending outside of said container means such that when said shaft means rotates the electric generator means can generate electricity;

(c) introducing compressed gas means into the fluid means in proximity to the lowest elevation of the plurality of fin means such that the compressed gas means produces a buoyancy force against the leading fin of the turbine compartments in proximity to the lowest elevation and causes the turbine compartments along with the shaft means and the connected sleeve means to rotate with the turbine compartments rotating from the lower elevation towards the higher elevation as the compressed gas means expands against the leading fin in rising from buoyancy to the surface of the fluid means; and (d) venting the compressed gas means, that has evolved from the surface of the fluid means in each turbine compartment, from each fin compartment in proximity to the highest elevation in order not to restrict or stop rotation of the revolving plurality of fin means in their downward path from the highest elevation to the lowest elevation and to continue the rotation of the sleeve means which causes the electric generator means to generate electricity for use.

Therefore, it is an object of the present invention to provide an apparatus utilized in generating power.

It is another object of this invention to provide a method for revolving the vanes of a turbine means in a fluid contained within a container, a reservoir, or the like.

It is yet another object of this invention to provide a method for generating power from the method for revolving the vanes of a turbine in a fluid means contained within a container, a reservoir means, or the like, These, together with the various ancillary objects and features which will become apparent to those skilled in the art as the following description proceeds, are attained by this improved apparatus and process, a preferred embodiment being shown with reference to the accompanying drawings, by way of example only, wherein:

DETAILED DESCRIPTION OF THE INVENTION

Referring in detail now to the drawings, wherein similar parts of the invention are identified by like reference numerals, there is seen the apparatus of this invention, generally illustrated as 10, which is supported by a base foundation 12. The apparatus 10 includes a compressor 14 which compresses any gas means (e.g. air, etc.) to be introduced into a compressed gas means storage tank 16 via conduit 18. Compressed gas means may be flowed from the storage tank 16 into another apparatus, generally illustrated as 18, through a conduit 20 having a valve 22 to regulate the flow of compressed gas means.

Figure 4:
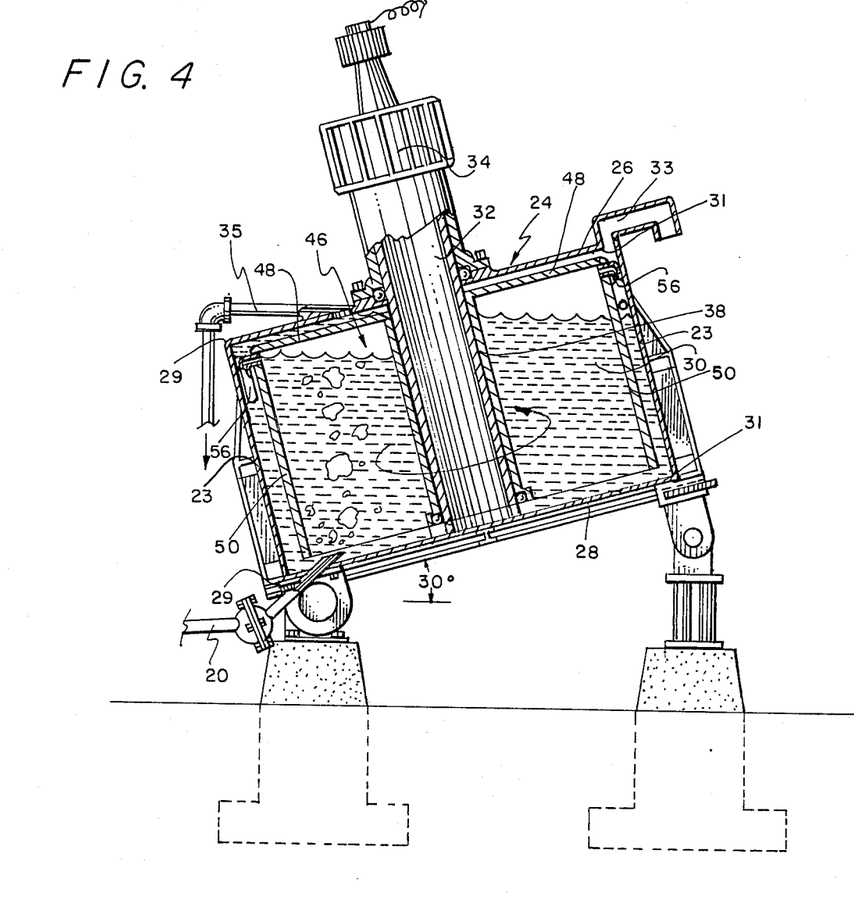
FIG. 4 is a partial vertical sectional view taken in direction of the arrows and along the plane of line 4—4 in FIG. 2.
Figure 5:
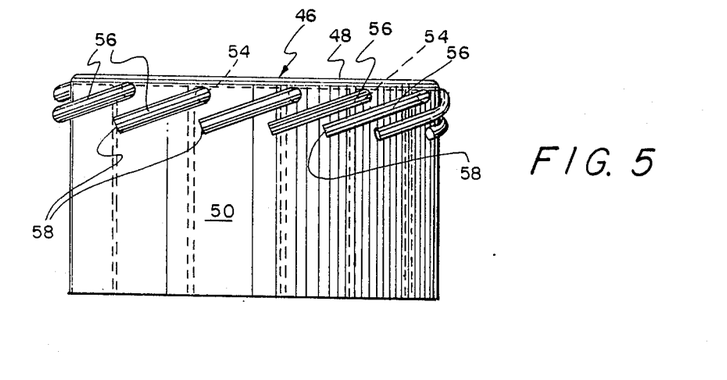
FIG. 5 is a side elevational view of the turbine container including the angularly disposed vent conduits.
Figure 9:
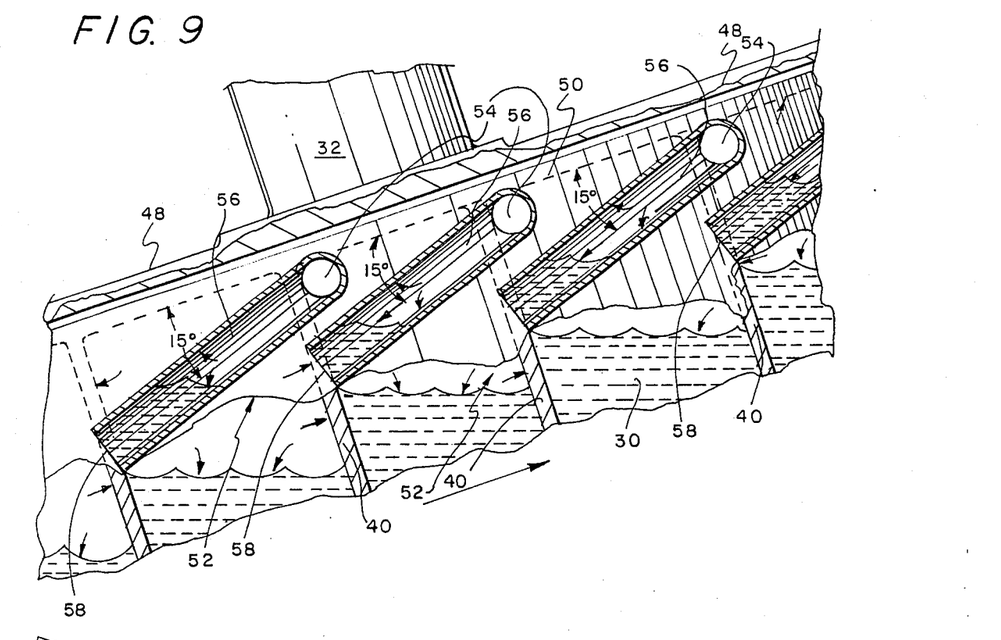
FIG. 9 is an enlarged partially vertical sectional view of the top of the turbine compartments, including the angularly disposed vent conduits, in the upward rotational path.
Figure 10:
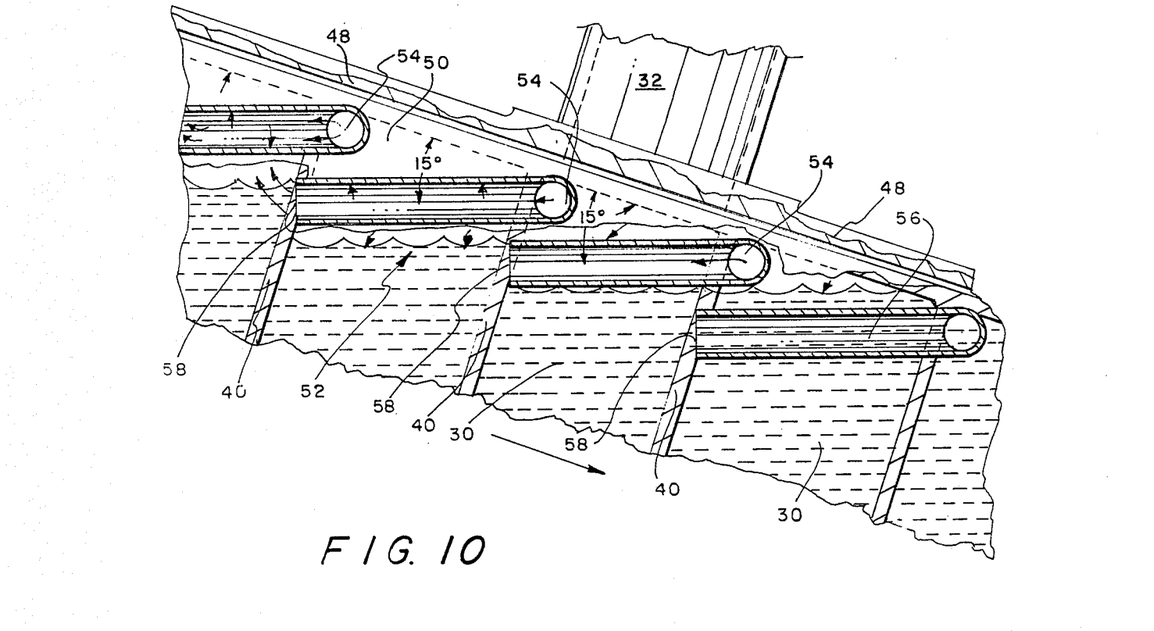
FIG. 10 is an enlarged partially vertical sectional view of the top of the turbine compartment, including the angularly disposed vent conduits, in the downward rotational path.
Figure 11:
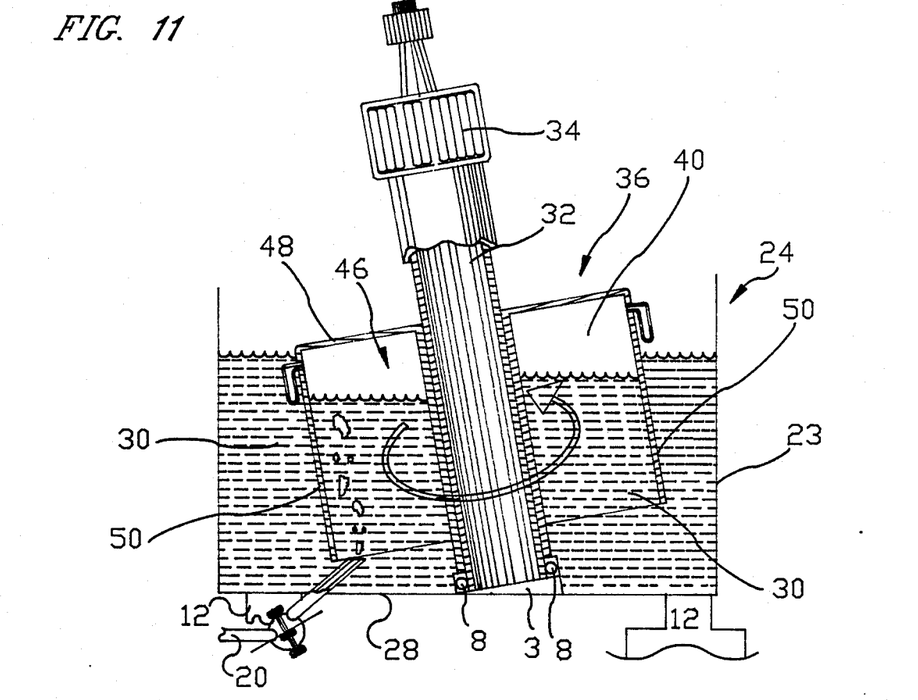
FIG. 11 is a partial vertical sectional view of the turbine container disclosing the turbine container in a generally horizontal position without a container top and with the turbine means having a turbine sleeve that is bound to a tilting shaft.
Figure 12:
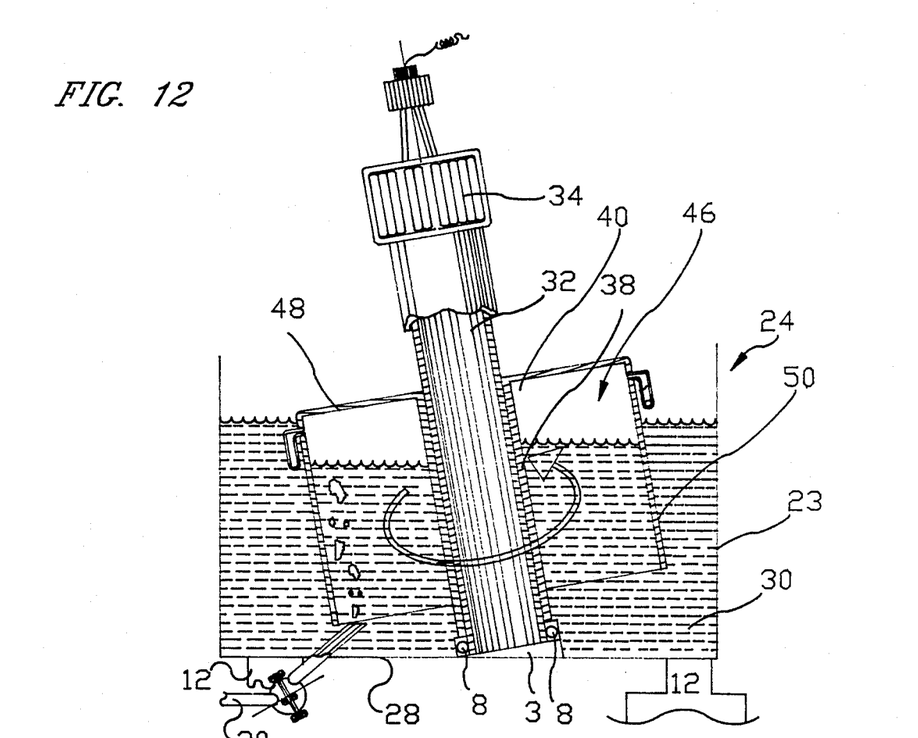
FIG. 12 is a partial vertical sectional view of the turbine container and turbine means of FIG. 11 but with the turbine means having no turbine sleeve and the vanes connecting directly to the shaft.

Apparatus 18 is utilized in generating power for use and includes a container means, generally illustrated as 24. Whenever "container means" is referred to in the specification and the claims, it should be construed to mean any container, reservoir, or the like, having a defined bottom and side with a fluid means 30, including but not limited to lakes, ponds, rivers, and containers in general. In a preferred embodiment of the present invention, container means 24 is a generally cylindrical container 24 having a container bottom 28, and a container side 23. In a preferred embodiment for the invention as illustrated in FIGS. 1–10 and FIG. 16, generally cylindrical container 24 additionally includes a container top 26. In one preferred embodiment of the invention as illustrated in FIGS. 11, 12 and 15, container bottom 28 has a facial plane that is generally horizontal plane. In another preferred embodiment of the invention, the facial plane of the container bottom 28 is angularly disposed with respect to a horizontal plane. In yet another preferred embodiment of the invention, the container top 26, as well as the container bottom 28, includes a facial plane which is angularly disposed with respect to a horizontal plane (see FIGS. 1–10 and 16). Preferably, the facial planes of the container top 26 and/or the container bottom 28 define from about 5 degrees to about 85 degrees angle with a horizontal plane; more preferably, the facial planes of the container top and/or the container bottom 28 are approximately 30 degrees with a horizontal plane (see FIGS. 1, 4, 13, 14 and 16). When the facial planes of the container top 26 and/or the container bottom 28 are angularly disposed with respect to a horizontal plane in accordance with one of the foregoing angles (i.e. 5–85 degrees), the container top 26 and/or the container bottom 28 would have a lowest point 29 and a highest point 31 with respect to a horizontal plane, as illustrated in FIG. 4. In the preferred embodiment of the invention illustrated in FIGS. 1–4, the highest point 31 on the container top 26 has a container vent opening 33 for venting air. Also, the container top 26 has an overflow conduit 35 secured thereto (see FIG. 4).

The container means 24 (or, as was previously mentioned, any reservoir means) contains a fluid means 30 which is preferably water. It should be understood that fluid means 30 may be any fluid that allows compressed gas means to evolve and buoyantly expand as it rises to the surface. As a matter of economics, the fluid means 30 is preferably water.

A shaft 32 is concentrically, rotatably disposed in the cylindrical container 24. In the embodiment of the invention for FIGS. 1–10 and 16 shaft 32 extends through the container top 26 of the container 24. In FIGS. 11, 12, 13, 14 and 15, the container 24 has no container top 26 and the shaft 32 extends up and beyond the surface of the fluid means 30, and the container 24. Also, in FIGS. 12, 13 and 15, the shaft 32 is rotatably supported on the container bottom 28 by bearings 8—8 supported by a platform 3. An electric generator 34 is mounted to and around the shaft 32 (see FIGS. 1-4, and FIGS. 11-16) such that when the shaft 32 rotates, the electric generator 34 generates electricity.

The apparatus 18 also includes a generally cylindrical turbine means, generally illustrated as 36. In all embodiments of the invention, turbine means 36 comprises a plurality of fins 40, or the like (see FIG. 7). In the embodiment of the invention for FIGS. 12, 13, 15 and 16, the fins 40 are bound to the shaft 32 in order to rotate therewith. In the remaining embodiments for the present invention, fins 40 are bound to a turbine sleeve 38 which is bound to the shaft 32 in order to rotate therewith and impart rotational power to the shaft 32. Each fin 40 has a fin top 42 and a fin side 44.

Figures 6, 8:
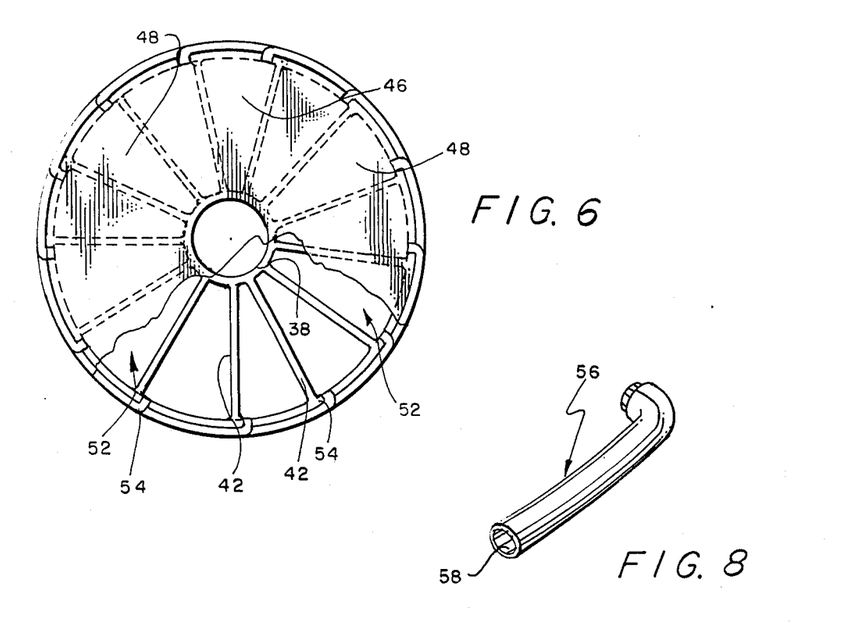
FIG. 6 is a top plan view of the turbine container partially disclosing the turbine.
FIG. 8 is a perspective view of the vent conduit.
Figure 7:
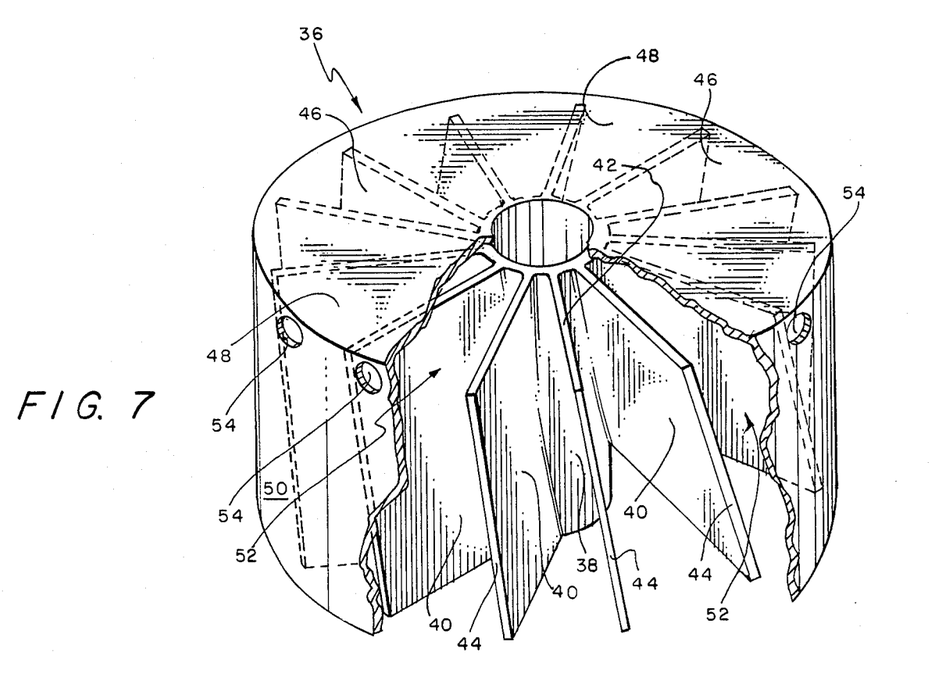
FIG. 7 is a perspective view of the turbine container of FIG. 6.

The plurality of fins 40 radially (or tangentially) extends outwardly from the turbine sleeve 38 or the shaft 32, as illustrated in FIGS. 6, 7, and FIGS. 12, 13, 15 and 16, respectively. Each of the fins 40 is angularly disposed with respect to the longitudinal axis of the turbine sleeve 38 and/or the shaft 32 such that the bottom of each fin 40 is disposed ahead of its top 42 in the direction of rotation, which may be either in a clockwise or counter clockwise direction. Preferably the turbine 36 rotates in a counter clockwise direction and would include the structure in FIG. 7 with the turbine sleeve 38 being optional. As illustrated in FIG. 7, the longitudinal axis of the turbine sleeve 38 is not parallel to the fin side 44, which is indicative of the fact that the fin sides 44 are positioned at an angle with respect to the longitudinal axis of the turbine sleeve 38. Similarly, if no turbine sleeve 38 has been employed, the longitudinal axis of the shaft 32 is also not parallel to the fin side 44, and the fin sides 44 are positioned at an angle with respect to the longitudinal axis of the shaft 32. In either embodiment, the bottom of the fin 40 is disposed ahead of the top 42 of the fin 40 as the turbine 36 rotates in a counter clockwise direction. However, this feature is not the more preferred embodiment of the invention. In a more preferred embodiment of the invention, the fin sides 44, or the facial plane of the fins 40—40, are positioned from 0 degrees to about +60 degrees (preferably plus or minus 20 degrees) with the longitudinal axis of the shaft 32 and/or the shaft 32 plus the turbine sleeve 38. Any given pair of fins 40—40 has a leading fin and a trailing fin as the turbine 36 rotates. The trailing fin of one given pair of fins 40—40 defines the leading fin of an immediate subsequent pair of fins 40—40 with respect to when and in the direction which the turbine 36 rotates.

A generally cylindrcial turbine cap, generally illustrated as 46, attaches to the turbine sleeve 38 and/or to the shaft 32 and to the tops 42 and sides 44 of the plurality of fins 40. The turbine cap 46 comprises a cap top 48 and a cap side 50 integrally bound to the cap top 48 and spacedly positioned away from the side 23 of the cylindrical container as illustrated in FIG. 4. In the embodiment of the invention employing the turbine sleeve 38, the cap top 48 attaches to the turbine sleeve 38 as indicated in FIG. 7, allowing the turbine sleeve 38 to remain open in order for the shaft 32 to extend therethrough. In this embodiment also, as well as the embodiment of the invention not employing the turbine sleeve 38, the cap top 48 is also connected circumferentially to and around the shaft 32 as well as to the tops 42 of each of the plurality of fins 40 and forms an air tight seal therewith (see FIGS. 6 and 7, and FIGS. 12 and 13). The cap side 50 connects with and forms an air tight seal with the sides 44 of the plurality of fins 40 such that a portion of the outside circumferential area of the turbine sleeve 38 and any given pair of fins 40—40 having its tops 42—42 and sides 40—40 bound to the cap top 48 and to the cap side 50 of the turbine cap 46 defines a turbine compartment each generally illustrated as 52 (see FIGS. 6 and 7). In the embodiment of the invention not employing the turbine sleeve 38, each turbine compartment 52 would include a portion of the outside circumferential area of the shaft 32 instead of the turbine sleeve 38. The bottom of each of the fins 40 and the bottom of the cap side 50 are disposed off the bottom 28 of the container 24 in order to allow the fluid 30 to communicate between the space between the cap side 50 and the side 23 of the container 24 and the space, including the turbine compartments 52, underneath the turbine cap 46.

In one preferred embodiment of the invention, each turbine compartment 52 has a vent aperture 54 disposed in the cap side 50 of the turbine cap 46 and preferably in proximity to the top 42 of a trailing fin 40 of any given pair of fins 40—40 defining the side walls of a turbine compartment 52 (see FIGS. 6 and 7). A generally cylindrical vent conduit 56 (see FIG. 8) having an open end 58 is secured to each of the vent apertures 54 such as to have its open end 58 trailing the vent apertures 54 with respect to the rotational direction of the turbine 36. This is clearly illustrated in FIGS. 5, 9 and 10 where the turbine 36 is constructed for counter clockwise rotation and the vent apertures 54 are positioned in the cap side 50 of the turbine cap 46 in proximity to the top 42 of the trailing fin 40 in a given turbine compartment 52. As the turbine 36 in FIGS. 5, 9 and 10 rotates counter clockwise the open end 58 of each of the vent conduits 56 secured to the vent apertures 54, trails the vent apertures 54 of any given turbine compartment 52. The purpose for preferably positioning the vent aperture 54 and any attached vent conduit 56 in proximity to the top 42 of a trailing fin 40 of any given pair of fins 40—40 is to entrap a given volume of gas means on the upward rotational path while being capable of venting this same volume of entrapped gas menas on the downward rotational path, from the displacement of the entrapped gas means with any fluid 30 that enters and fills each turbine compartment 52 on the downward rotational path. If the vent aperture 54 and any attached vent conduit 56 is positioned in proximity to a leading fin 40 of any given pair of fins 40—40, then on the downward rotational path the given entrapped volume of gas means will generally not be completely vented, leaving a residual gas pocket in proximity to the top of the trailing fin 40. In the event that clockwise rotation of the turbine 36 is desired, the vent apertures 54 preferably would be moved and disposed in the cap side 50 in proximity to the top 42 of the then trailing fin 40 in any given turbine compartment 52 and the vent conduits 56 preferably would all have their respective open ends 58 trailing and facing in the opposite direction of the vent conduits 56 in FIGS. 5, 9 and 10.

The plurality of vent conduits 56 all have a longitudinal axis. I have found that the longitudinal axis of the vent conduits 56 preferably has an angular disposement with the facial plane of the container top 26 or the turbine cap top 48 that is no greater than the angular disposement that the facial planes of the container top 26 and the container bottom 28 have with a horizontal plane. More preferably, the vent conduits 56 are secured to the vent apertures 54 such that the longitudinal axis of each of the vent conduits defines from about 0 to about 50 with the facial plane of the container top 26 and/or the turbine cap top 48. Most preferably, the vent conduits 56 are secured to the vent apertures 54 such that the longitudinal axis of each of the vent conduits 56 defines with the facial plane of the container top 26 and/or the turbine cap top 48 about one-half (½) of the number of degrees that the facial planes of the container top 26 and the container bottom 28 defines with a horizontal plane. Thus, as was previously mentioned, since the facial planes of the container top 26 and/or the container bottom 28 of the container 24 are more preferably approximately 30 degrees with a horizontal plane, the more preferred angular disposition of the longitudinal axis of each of the vent conduits 56 with the facial plane of the container top 26 and/or the turbine cap top 48 is approximately 15 degrees as illustrated in FIGS. 9 and 10.

Figure 15:
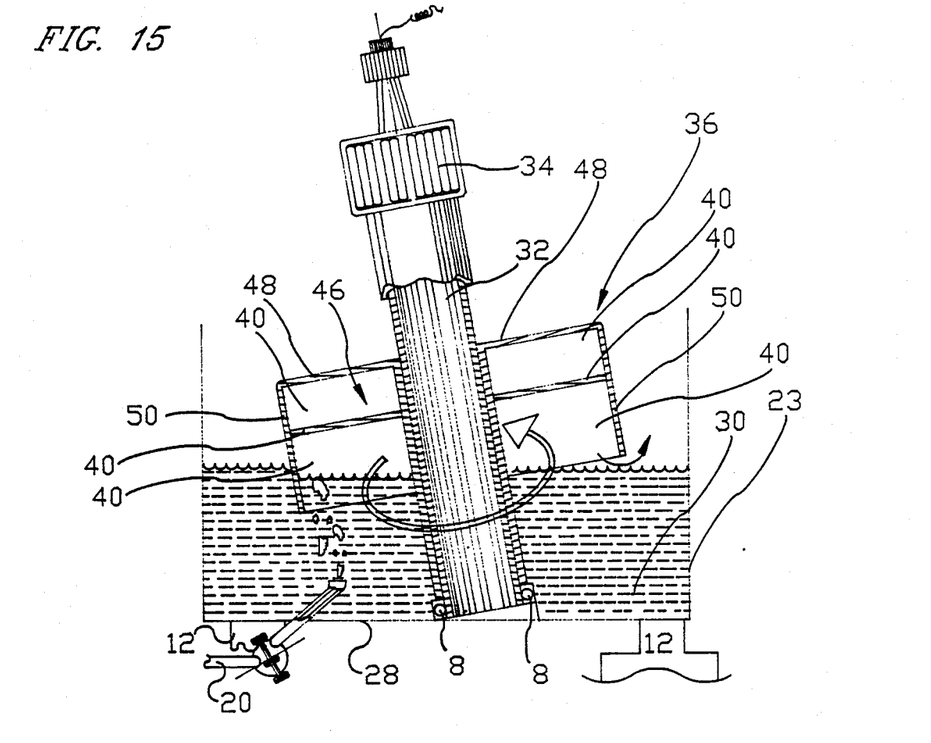
FIG. 15 is a partial vertical sectional view of the apparatus of this invention with the turbine means having no turbine sleeve and the container generally horizontal and not having a container top, and with the venting taking place when the turbine leaves the fluid means in proximity to its highest elevation with respect to the fluid means.
Figure 16:
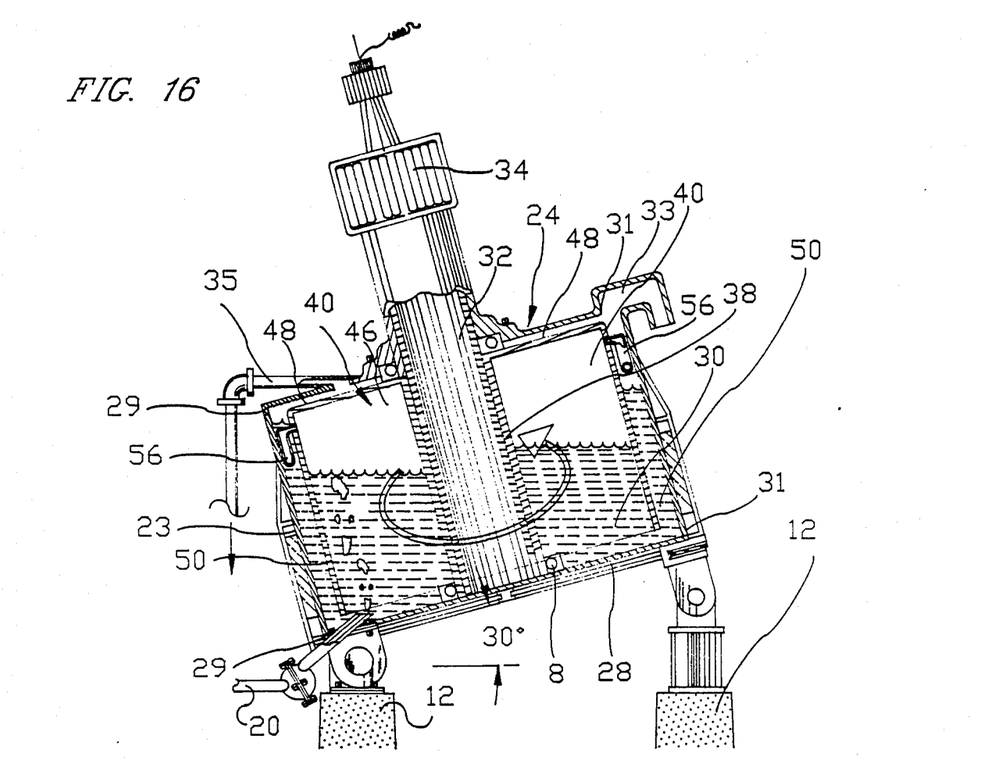
FIG. 16 is a partial vertical sectional view of the apparatus of this invention with the turbine means not having a sleeve means and the vanes connecting directly to the shaft.
Figure 17:
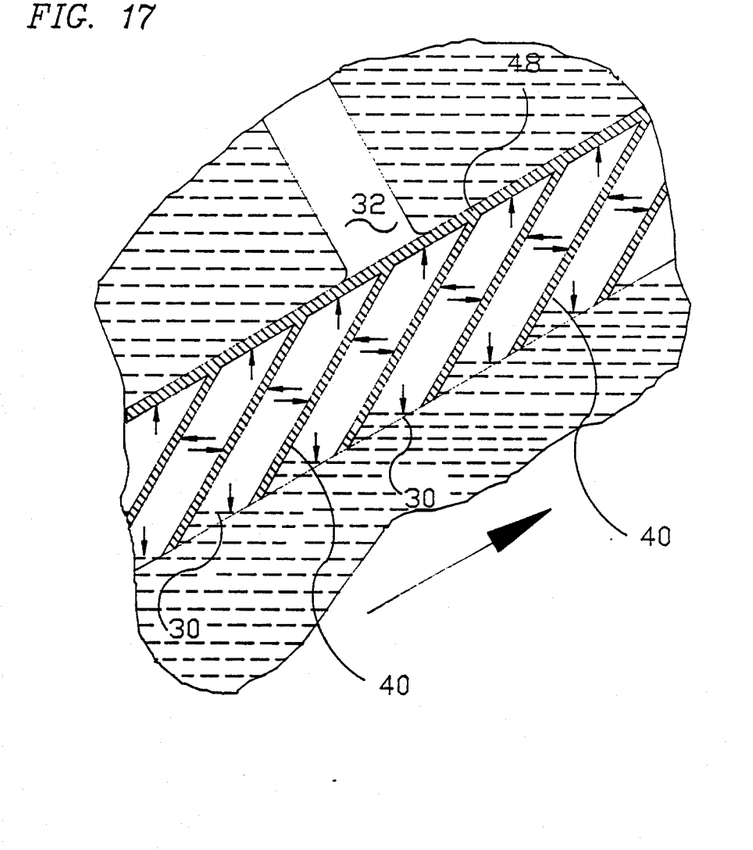
FIG. 17 is an enlarged partially partially vertical sectional view of the turbine compartments having no vent apertures and in the upward rotational path.
Figure 18:
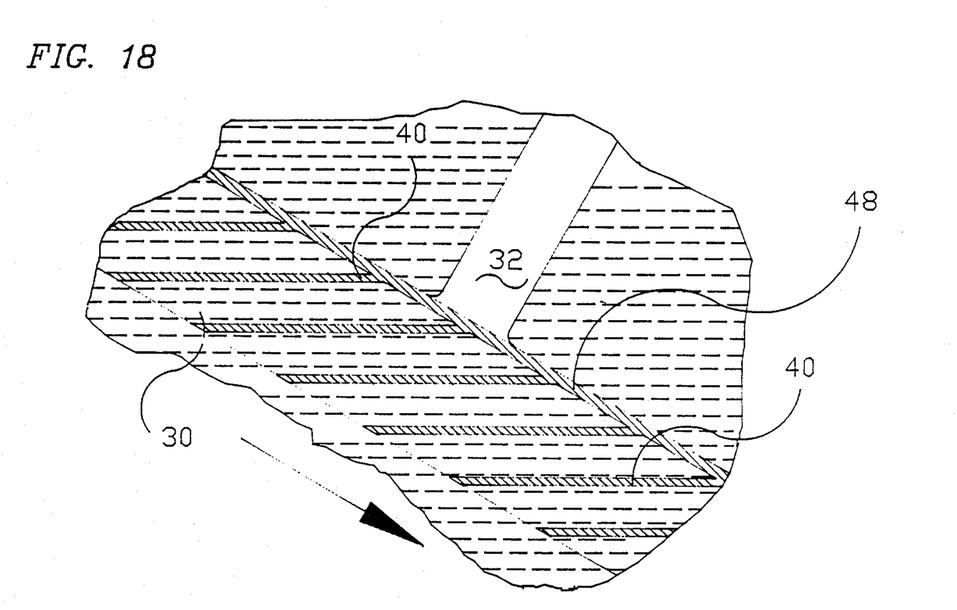
FIG. 18 is an enlarged partially vertical sectional view of the turbine compartments of FIG. 17 in the downward rotational path.

In another preferred embodiment of the invention, each turbine compartment 52 has no vent aperture 54 (see FIG. 15), and venting of compressed gas means is accomplished from underneath the bottom of the cap side 50 and the fins 40—40 when each turbine compartment 52 leaves the fluid means 30, as illustrated in FIG. 15. FIG. 15 disclosed in its partial vertical sectional view, two sloping vanes 40—40 on each side of the shaft 32, with the leading vane 40 on one side of the shaft 32 being sectionalized, and the trailing vane 40 on the other side of the shaft 32 situated behind a leading vane 40 and sectionalized. With respect to this embodiment of the invention not employing any vent aperture 54 and/or vent conduit 56, the vanes 40 preferably slope from about 10 degrees to about 50 degrees [with about 30 degrees (see FIGS. 17 and 18) being the more preferred] with respect to the facial plane of the turbine cap top 48. With this angular disposement of the vanes 40—40 with respect to the turbine cap top 48, any given volume of entrapped gas means will be vented on the downward rotational path by the given volume of entrapped gas means being displaced by any fluid 30 than enters and fills each turbine compartment 52 on the downward rotational path.

Figure 13:
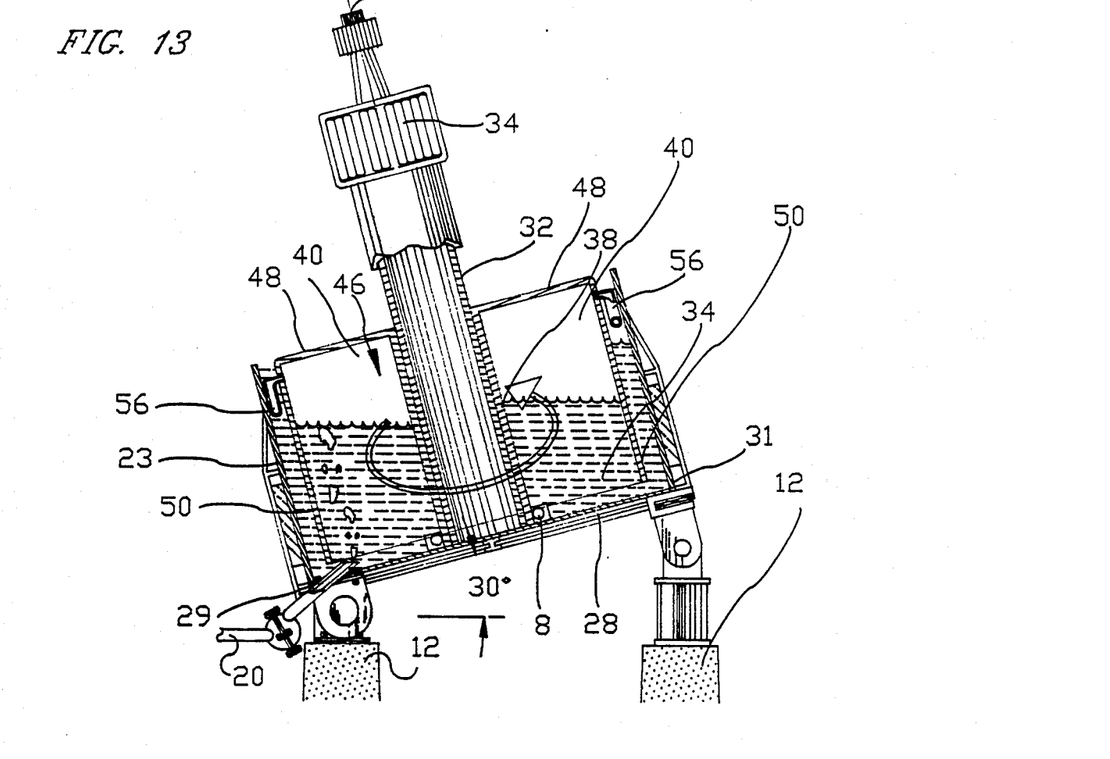
FIG. 13 is a partial vertical sectional view of the apparatus of this invention but with the turbine container not having a container top, and the turbine means having no turbine sleeve and the vanes connecting directly to the shaft.
Figure 14:
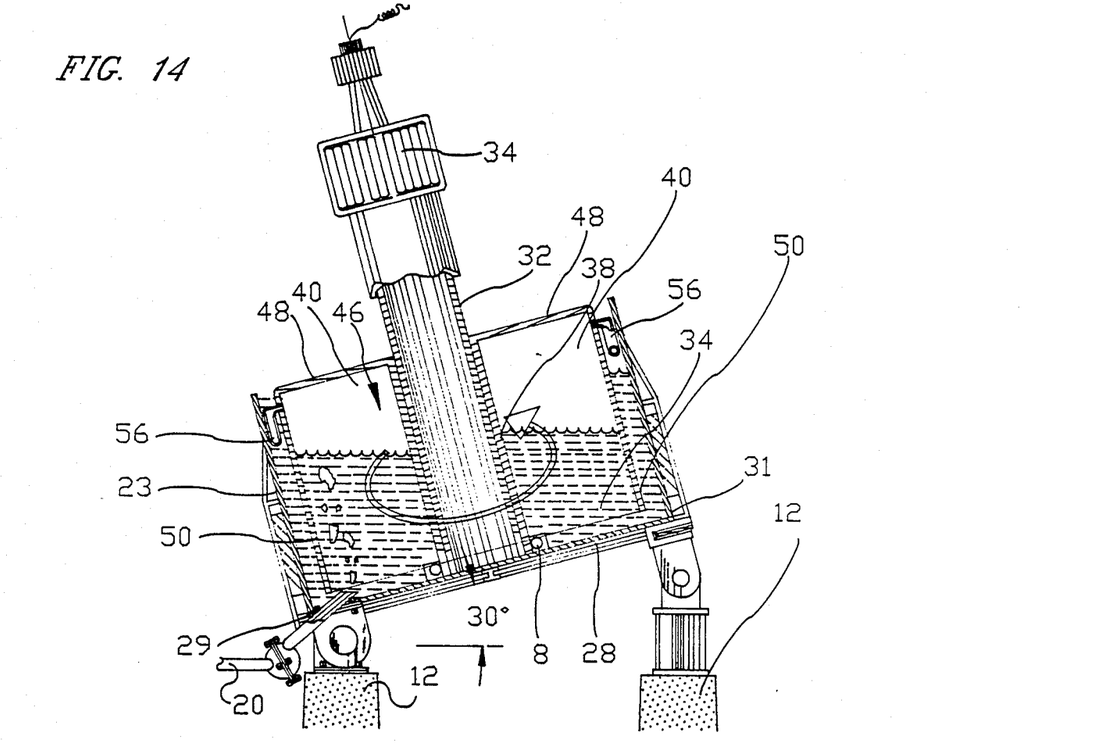
FIG. 14 is a partial vertical sectional view of the apparatus of this invention but with the turbine container not having a container top.

Compressed gas means is flowed through the conduit 20 and is introduced to and/or through the container bottom 28 (see FIG. 4) into the fluid 30 in proximity to the lowest point 20 of the container bottom 28 with respect to a horizontal plane. In the embodiment of the invention employing the container bottom 2 horizontally, compressed gas means is introduced to and/or through the container bottom 28 into the fluid 30 in proximity to the lowest point of when the bottom of the cap side 50 is lowest in the revolving posture, as illustrated in FIGS. 11, 12 and 13. As the compressed gas means produces a buoyancy force against the plurality of fins 40 and expands thereagainst buoyantly to the surface of the fluid 30 from the lowest depth thereof (see FIG. 4), the plurality of fins 40 commence to rotate with the expansion and buoyancy of the compressed gas means from the lowest elevation in proximity to 29 to the highest elevation in proximity to 31. As the plurality of fins 40 rotate, this causes the entire turbine 36, to rotate which in turn causes the shaft 32 to rotate. In the embodiment of the invention having a turbine sleeve 38, the fins 40 cause the turbine sleeve 38 to rotate. The rotating turbine sleeve 38 imparts rotational power to the shaft 32, which in turn can cause the electric generator 34 to generate electricity.

With continuing reference to the drawings for operation of the invention, and the method for revolving vanes of turbine means in a fluid 30 within the container 24 from a lower elevation to a higher elevation, and the method for generating power from the vanes of a turbine means which are revolving from a lower elevation to a higher elevation in the fluid 30 within the container 24, the fins 40 are bound to the shaft 32 or to the sleeve 38 in such a manner as to be respectively angularly disposed about 20 degrees with respect to the longitudinal axis of the shaft 32 or the turbine sleeve 38 respectively; that is, the fin side 44 is not parallel with the longitudinal axis of the shaft 32 or the sleeve 38. Each of the fins 40 is also bound to the shaft 32 or the sleeve 38 in such a manner that the bottom of each fin 40 is diposed ahead of its top 42 in the direction of rotation of the fin 40, which for operation of the invention and the subject methods will be counter clockwise. If the turbine sleeve 38 is being used, it is bound to the shaft 32 that is preferably generally normal with respect to the facial planes of the top 26 and bottom 28 of the container 24 and has a longitudinal axis that is less than normal with respect to a horizontal plane. In a preferred embodiment of the invention, the longitudinal axis of the shaft 32 defines an approximate 60 degree angle with a horizontal plane.

The plurality of fins 40 is enclosed underneath the cap 46 which has the cap top 48 and the cap side 50. Enclosure is accomplished by attaching to the cap top 48 and the top 42 of each of the plurality of fins 40 and attaching to the cap side 50 to the side 44 of each of the plurality of fins 40. The seals between the cap top 48 and the fin top 42 and the seal between the cap side 40 and the fin side 44 are all air-tight. Any given pair of fins 40—40 having its tops 42—42 and its sides 44—44 bound to the top 48 and side 50 of the cap 46 forms a compartment 52. Also, any given pair of fins 40—40 has a leading fin and a trailing fin and, as was previously mentioned, the trailing fin of one given pair of fins 40—40 defines the leading fin 40 of an immediate subsequent pair of fins 40—40 with respect to when the plurality of fins 40 rotate.

Figure 1:
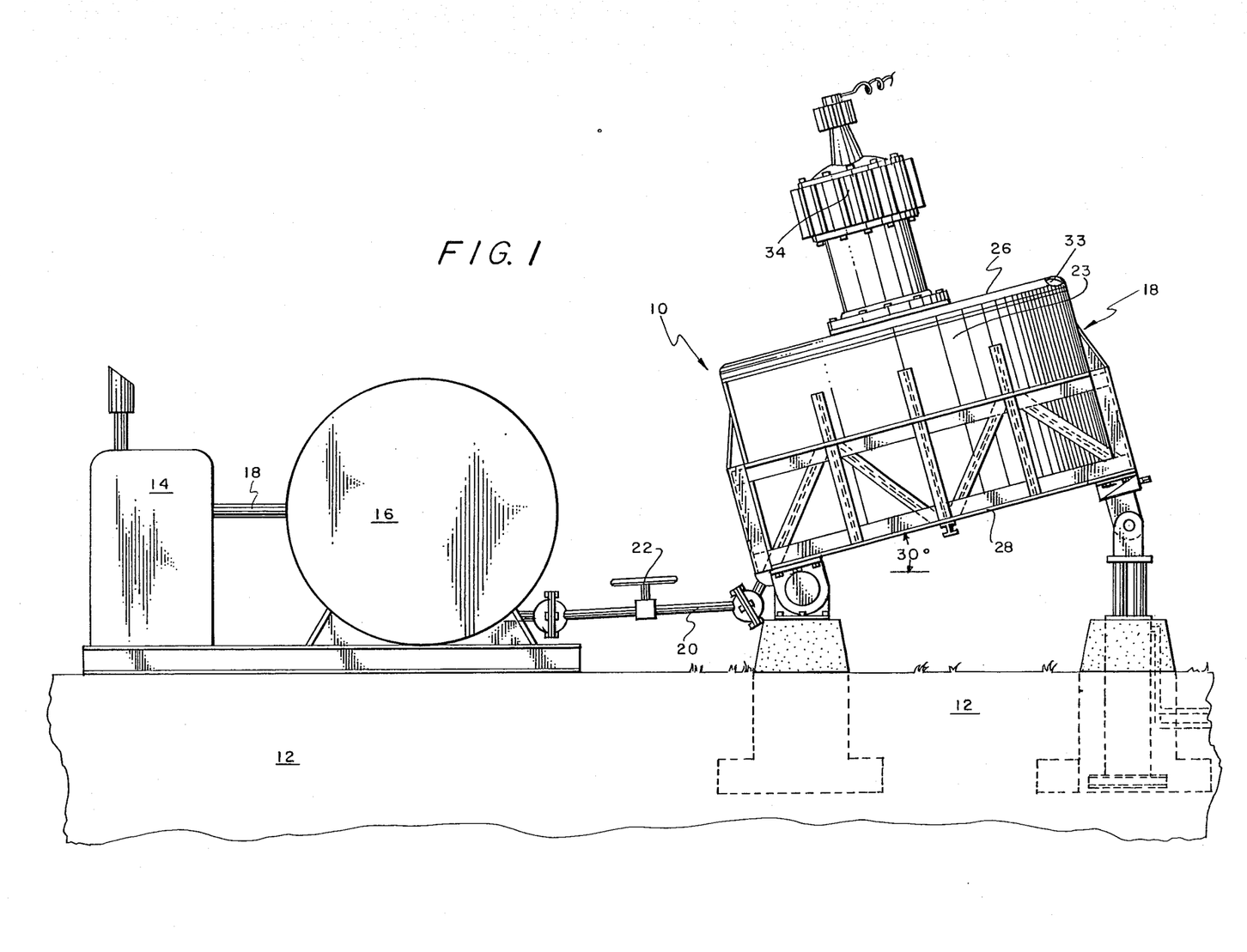
FIG. 1 is a side elevational view of the apparatus of this invention.

In the embodiment of the invention that uses vent apertures 54, the vent apertures 54 are preferably disposed in the cap side 50 in proximity to the top of the trailing fin 40 of any given pair of fins 40—40 which defines the side walls of a compartment 52. The generally cylindrical vent conduit 56 is preferably attached to each of the vent apertures 54 such that its open end 58 trails the vent apertures 54 (see FIGS. 5, 9 and 10) in the counter clockwise rotation of the plurality of fins 40, and its longitudinal axis defines with the facial plane of the cap top 48 (and/or the optional container top 26) about one-half (½) of the number of degrees that the facial planes of the bottom 28 and top 26 of the container 24 defines with a horizontal plane. Because, as was previously mentioned, the facial planes of the container bottom 28 and/or the optional container top 26 are preferably approximately 30 degrees with a horizontal plane, as illustrated in FIGS. 1 and 4, the longitudinal axis of each of the vent conduits 56 is preferably angularly disposed to entrap a volume of gas means in a compartment 52 about 15 degrees from the facial plane of the cap top 48 (and/or the optional container top 26).

In order to counter clockwise rotate any given compartment(s) 52 from a lower elevation in proximity to 29 to a higher elevation in proximity to 31 and commence revolving the fins 40 in the same direction, compressed gas means, preferably air, is introduced from the storage tank 16 via conduit 20 through the container bottom 28 into the fluid 30 in proximity to the lowest point 29 of the container bottom 28 (see FIG. 4) or in proximity to the lowest point of when the bottom of the cap side 50 is lowest in its revolving posture (see FIGS. 11, 12 and 13). At this point of introduction, which is behind the cap side 50, compressed air is emitted into the fluid 30 in proximity to the deepest part of the fluid 30 with respect to one embodiment of the invention, and, in all embodiments of the invention, evolves buoyantly to impinge against the leading fin 40 of any compartment 52 in proximity to the lowest elevation 29 at the bottom 28 on container 24, or in proximity to the lowest point of when the bottom of the cap side 50 is lowest in its revolving posture (see FIGS. 11, 12, and 13). Expansion and buoyancy of the compressed air against the leading fin 40 in rising to the surface of the fluid 30 causes the plurality of fins 40 including their respective compartments 52 to start rotating counter clockwise from the lower elevation (which for one embodiment of the invention is in proximity to 29 of the bottom 28) towards the higher elevation (which for the same embodiment employing reference 29 is in proximity to 31 of the bottom 28 and the optional top 26).

In one embodiment of this invention, as the respective compartments 52 of the plurality of fins 40 approach the higher elevation in proximity to 31 of the optional top 26 and the container bottom 28, and the level of the fluid 30 within any respective compartment 52 falls below the level of the open end 58 of the respective vent conduit 56 (see FIG. 4), the entrapped compressed gas means vents out of the respective compartment 52 through the vent aperture 54 in proximity to its trailing fin 40, through its respective vent conduit 56 into the space between the cap side 50 and the container side 23, and out into the atmosphere (or through the optional container vent opening 33 into the atmosphere). In FIGS. 11 and 12 entrapped compressed gas means is vented through the respective vent conduits straight into the atmosphere. In the preferred embodiment of the invention wherein each turbine compartment 52 has no vent apertures 43 (see FIG. 15), the venting of the entrapped compressed gas means is accomplished from underneath the bottom of the cap side 50 and the fins 40—40 when each turbine compartment 52 leaves the fluid means 30.

An important feature of this invention is that the compressed gas means that has evolved from the surface of the fluid 30 in each compartment 52 be vented from each compartment 52 in proximity to the highest elevation (i.e. at about 31 the top 26 of the container 24) in order not to restrict, impede, or stop the counter clockwise rotation of the plurality of fins 40 in their respective compartment(s) 52 in their downward path from the highest elevation to the lowest elevation (see FIG. 10). If compressed gas means remains entrapped within the respective compartments 52, the entrapped gas means is recompressed in the downward path of the plurality of fins 40 and their respective compartments 52. This would retard, impede, restrict or even completely stop the rotation of the plurality of fins 40 and their respective compartments 52. The restrictive force acting against the counter clockwise rotation of the plurality of fins 40 by having to recompress entrapped gas means may be likened to attempting to immerse an expanded balloon under water.

Figure 2:
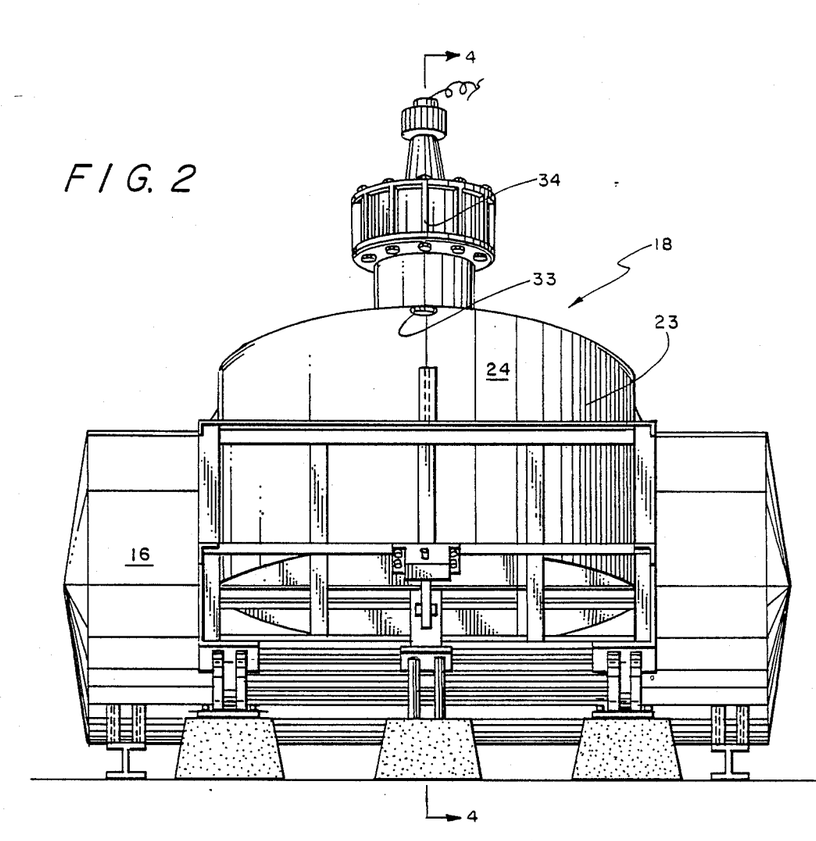
FIG. 2 is an end elevational view of the apparatus of FIG. 1.
Figure 3:
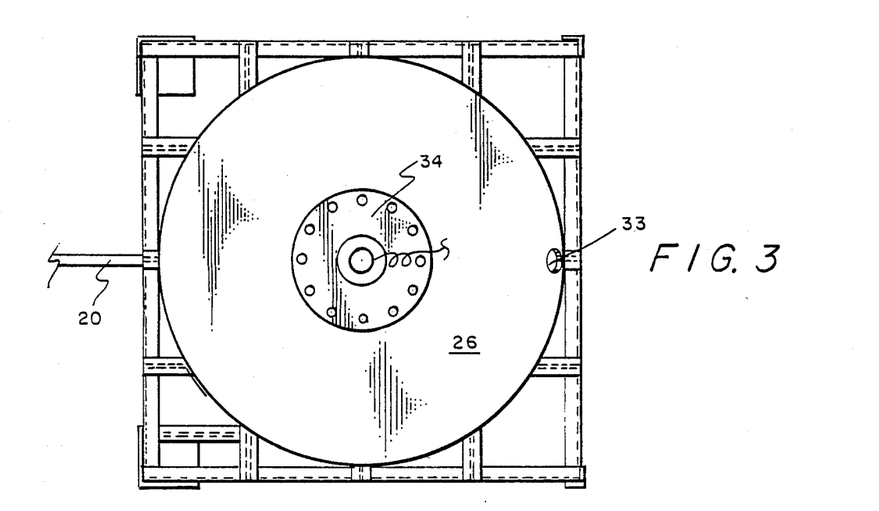
FIG. 3 is a top plan view of a facial plane of the container having the turbine and a generator mounted on top thereof.

My novel method for revolving a plurality of fins 40 in a fluid 30 within the container 24 may be utilized in generating power. One of the many advantages the present invention has is that the resistance in the downward rotational path due to fluid turbulence is reduced from the lower velocity or revolution(s) per given time of the turbine 36. The compressor 14 compresses gas means which is used and/or may be stored in the storage tank 16 for future use. The plurality of fins 40 are either bound directly to the shaft 32, or to the sleeve 38 as illustrated in FIG. 4. If the fins 40 are bound directly to the shaft 32, the revolving fins 40 impart rotational power to the shaft 32. If the fins 40 are bound to the sleeve 38, as the fins 40 rotate bounded to the sleeve 38, the revolving sleeve 38 imparts rotational power to the shaft 32. The shaft 32 extends outside of the container 24. If an electric generator 34 is mounted to and around the shaft 32 as illustrated in FIGS. 1, 2 and 4, when the shaft 32 rotates, the electric generator 34 is in a position to generate electricity for use. It should be understood that whenever an apparatus 10 is referred to herein, with respect to the embodiment of the invention in FIGS. 1–10 and FIG. 16, it means respectively an apparatus 10 or an assemblage of apparatuses 10 arranged in series such that any compressed gas means exiting one apparatus 10 through its respective container vent opening 33 (and still under pressure, e.g. 30 psig) is conducted through a conduit or the like (not shown in the drawings) to a second apparatus 10 where it becomes input compressed gas means through conduit 20 for the second apparatus 10. A series of apparatuses 10 may be arranged as such. There are two primary design advantages to this invention over a horizontal axis turbine. First, there is a power upstroke through the maximum moment arm. Second, a larger diameter turbine may be utilized for a given depth of liquid.

While the present invention has been described herein with reference to particular embodiments thereof, a latitude of modifications, various changes and substitutions are intended in the foregoing disclosure, and it will be appreciated that in some instances some features of the invention will be employed without a corresponding use of other features without departing from the scope of the invention as set forth.

I claim:

1. An apparatus utilized in generating power comprising a base foundation means;
    a generally cylindrical container means having a container bottom;
    a fluid means contained within said container means;
    a shaft means generally concentrically rotatably disposed in said cylindrical container means;
    a generally cylindrical turbine means rotatably within said container means having the fluid means and comprising a plurality of fin means and a turbine top that is bound circumferentially to said shaft means and is angularly disposed with respect to a horizontal plane and forms a seal with the top of each of the plurality of fin means, said cylindrical turbine means additionally comprising a turbine side integrally bound to said turbine top and spacedly positioned away from the side of the cylindrical container means and connects with and forms a seal with the side of each of the plurality of fin means such that any given pair of fin means having its tops and sides respectively bound to the turbine top and the turbine side defines a turbine compartment;
    a means for introducing compressed gas means through said container bottom in proximity to the lowest point of said turbine means with respect to a horizontal plane in order for the turbine means to rotate the shaft means when the compressed gas means produces a buoyancy force against the plurality of fin means and expand thereagainst as it rises from buoyancy to the surface of the fluid means causing the plurality of fin means to rotate with the expansion and buoyancy of the compressed gas means;
    and a means for allowing the compressed gas means to exit from the turbine means when in proximity to the highest point of said turbine means with respect to said horizontal plane.

2. The apparatus of claim 1 wherein said cylindrical container means has a container top comprising a facial plane that is angularly disposed with respect to a horizontal plane and a container vent opening in proximity to its highest point with respect to a horizontal plane.

3. The apparatus of claim 1 wherein said container bottom of said cylindrical container means has a facial plane that is angularly disposed with respect to a horizontal plane.

4. The apparatus of claim 3 additionally comprising a container top bound to the top of said cylindrical container means, said container top has a facial plane that is generally parallel with the facial plane of said container bottom.

5. The apparatus of claim 2 wherein said shaft means extends through the container top.

6. The apparatus of claim 4 wherein said shaft means extends through the container top.

7. The apparatus of claim 1 wherein said turbine means comprises a turbine sleeve means bound to said shaft means in order to rotate therewith and impart rotational power to the shaft means.

8. The apparatus of claim 7 wherein said plurality of fin means is integrally bound to said turbine sleeve means and extends outwardly therefrom such that any given pair of fin means has a leading fin and a trailing fin when the turbine means rotates, the trailing fin of one given pair of fin means defines the leading fin of an immediate subsequent pair of fin means with respect to when the turbine means rotate.

9. The apparatus of claim 1 wherein said turbine side has no vent aperture and said compressed gas means is vented through the open bottom of said turbine means.

10. The apparatus of claim 3 wherein said compressed gas means is introduced through said container bottom in proximity to the lowest point thereof.

11. An apparatus utilized in generating power comprising a base foundation means;
    a generally cylindrical container means comprising a container bottom having a facial plane that is angularly disposed with respect to a horizontal plane;
    a fluid means contained within said container means;
    a shaft means generally concentrically rotatably disposed in said cylindrical container means;
    a generally cylindrical turbine means rotatably within said container means having the fluid means and comprising a plurality of fin means and a turbine top with no vent aperture and bound circumferentially to said shaft means and angularly disposed with respect to a horizontal plane and forms a seal with the top of each of the plurality of fin means, said cylindrical turbine means additionally comprising a turbine side with no vent aperture and integrally bound to said turbine top and spacedly positioned away from the side of the cylindrical container means and connects with and forms a seal with the side of each of the plurality of fin means such that any given pair of fin means having its tops and sides respectively bound to the turbine top and turbine side defines a turbine compartment without any vent aperture;
    a means for introducing compressed gas means through said container bottom in proximity to the lowest point thereof with respect to a horizontal plane in order for the turbine means to rotate the shaft means when the compressed gas means produces a buoyancy force against the plurality of fin means and expands thereagainst as it rises from buoyancy of the compressed gas means;
    and means for allowing the compressed gas means to exit from the turbine compartments when said compartments exit the fluid.

12. The apparatus of claim 11 wherein said cylindrical container means has a container top comprising a facial plane that is angularly disposed with respect to a horizontal plane and a container vent opening in proximity to its highest point with respect to a horizontal plane.

13. The apparatus of claim 12 wherein said shaft means extends through the container top.

14. The apparatus of claim 11 wherein said turbine means comprises a turbine sleeve means bound to said shaft means in order to rotate therewith and impart rotational power to the shaft means.

15. The apparatus of claim 14 wherein said plurality of fin means is integrally bound to said turbine sleeve means and extends outwardly therefrom such that any given pair of fin means has a leading fin and a trailing fin when the turbine means rotate, the trailing fin of one given pair of fin means defines the leading fin of an immediate subsequent pair of fin means with respect to when the turbine means rotates.

16. An apparatus utilized in generating power comprising a base foundation means;
    a generally cylindrical container means comprising a container bottom having a facial plane that is angularly disposed with respect to a horizontal plane;
    a fluid means contained within said container means;
    a shaft means generally concentrically rotatably disposed in said cylindrical container means;
    a generally cylindrical turbine means bound to said shaft means and rotatably within said container means having the fluid means, said turbine means including a turbine sleeve means bound to said shaft means in order to rotate therewith and angularly disposed with respect to a horizontal plane and impart rotational power to the shaft means, a plurality of fin means integrally bound to said turbine sleeve means and extending outwardly therefrom such that any given pair of fin means has a leading fin and a trailing fin when the turbine means rotates, the trailing fin of one given pair of fin means defines the leading fin of an immediate subsequent pair of fin means with respect to when the turbine means rotates;
    a generally cylindrical turbine cap means having a cap top with no vent aperture and that attaches to the turbine sleeve means, connects circumferentially around the shaft means, and attaches with and forms a seal with the top of each of the plurality of fin means, said turbine cap means additionally having a cap side with no vent aperture and integrally bound to said cap top and spacedly positioned away from the side of the cylindrical container means and connects with and forms a seal with the side of each of the plurality of fin means such that any given pair of fin means having its tops and sides respectively bound to the top and side of the turbine cap means defines a turbine compartment without any vent aperture;
    a means for introducing compressed gas means through said container bottom in proximity to the lowest point thereof with respect to a horizontal plane in order for the turbine means to rotate the shaft means when the compressed gas means produces a buoyancy force against the plurality of fin means and expands thereagainst as it rises from buoyancy to the surface of the fluid means causing the plurality of fin means to rotate with the buoyancy of the compressed gas means;
    and a means for allowing the compressed gas means to exit from the turbine means when in proximity to the highest point of said turbine means with respect to said horizontal plane.

17. The apparatus of claim 16 wherein said container means additionally comprises a container top.

18. The apparatus of claim 17 wherein said container top has a facial plane that is angularly disposed with respect to a horizontal plane.

19. The apparatus of claim 18 wherein said container top has a container vent opening in proximity to its highest point with respect to a horizontal plane, and said shaft means extends through the container top.

20. An apparatus utilized in generating power comprising a base foundation means;
    a generally cylindrical container means having a container bottom;
    a fluid means contained within said container means;
    a shaft means generally concentrically rotatably disposed in said cylindrical container means;
    a generally cylindrical turbine means rotatably within said container means having the fluid means and comprising a plurality of fin means and a turbine top that is bound circumferentially to said shaft means and is angularly disposed with respect to a horizontal plane and forms a seal with the top of each of the pluralilty of fin means, said cylindrical turbine means additionally comprising a turbine side integrally bound to said turbine top and spacedly positioned away from the side of the cylindrical container means and connects with and forms a seal with the side of each of the plurality of fin means such that any given pair of fin means having its tops and sides respectively bound to the turbine top and turbine side defines a turbine compartment; each turbine compartment comprises a vent aperture;
    a means for introducing compressed gas means through said container bottom in proximity to the lowest point of said turbine means with respect to a horizontal plane in order for the turbine means to rotate the shaft means and expands thereagainst as it rises from buoyancy to the surface of the fluid means causing the plurality of fin means to rotate with the expansion and buoyancy of the compressed gas means.

21. The apparatus of claim 20 wherein said vent aperture is disposed in the turbine side of each turbine compartment and in proximity to the top of a trailing fin of any given pair of fin means defining the side walls of a turbine compartment.

22. The apparatus of claim 20 wherein said cylindrical container means has container top comprising a facial plane that is angularly disposed with respect to a horizontal plane and a container vent opening in proximity to is highest point with respect to a horizontal plane.

23. The apparatus of claim 20 wherein said container bottom of said cylindrical container means has a facial plane that is angularly disposed with respect to a horizontal plane.

24. The apparatus of claim 23 additionally comprising a container top bound to the top of said cylindrical container means, said container top has a facial plane that is generally parallel with the facial plane of said container bottom.

25. The apparatus of claim 22 wherein said shaft means extends through the container top.

26. The apparatus of claim 24 wherein said shaft means extends through the container top.

27. The apparatus of claim 20 wherein said turbine means comprises a turbine sleeve means bound to said shaft means in order to rotate therewith and impart rotational power to the shaft means.

28. The apparatus of claim 27 wherein said plurality of fin means is integrally bound to said turbine sleeve means and extends outwardly therefrom such that any given pair of fin means has a leading fin and a trailing fin when the turbine means rotates, the trailing fin of one given pair of fin means defines the leading fin of an immediate subsequent pair of fin means with respect to when the turbine mean rotates.

29. The apparatus of claim 20 wherein said turbine side has no vent aperture and said compressed gas means is vented through the open bottom of said turbine means.

30. The apparatus of claim 23 wherein said compressed gas means is introduced through said container bottom in proximity to the lowest point thereof.

31. An apparatus utilized in generating power comprising a base foundation means;
- a generally cylindrical container means comprising a container bottom having a facial plane that is angularly disposed with respect to a horizontal plane;
- a fluid means contained within said container means;
- a shaft means generally concentrically rotatably disposed in said cylindrical container means;
- a generally cylindrical turbine means rotatably within said container means having the fluid means and comprising a plurality of fin means and a turbine top that is bound circumferentially to said shaft means and is angularly disposed with respect to a horizontal plane and forms a seal with the top of each of the plurality of fin means, said cylindrical turbine means additionally comprising a turbine side integrally bound to said turbine top and spacedly positioned away from the side of the cylindrical container means and connects with and forms a seal with the side of each of the plurality of fin means such that any given pair of fin means having its tops and sides respectively bound to the turbine top and turbine side defines a turbine compartment;
- each turbine compartment comprises a vent aperture; and
- a means for introducing compressed gas means through said container bottom in proximity to the lowest point of said turbine means with respect to a horizontal plane in order for the turbine means to rotate the shaft means when the compressed gas means produces a buoyancy force against the plurality of fin means and expands thereagainst as it rises from buoyancy to the surface of the fluid means causing the plurality of fin means to rotate with the expansion and buoyancy of the compressed gas means.

32. The apparatus of claim 31 wherein said vent aperture is disposed in the turbine side of each turbine compartment and in proximity to the top of a trailing fin of any given pair of fin means defining the side walls of a turbine compartment.

33. The apparatus of claim 31 wherein said cylindrical container means has a container top comprising a facial plane that is angularly disposed with respect to a horizontal plane and a container vent opening in proximity to its highest point with respect to a horizontal plane.

34. The apparatus of claim 33 wherein said shaft means extends through the container top.

35. The apparatus of claim 31 wherein said turbine means comprises a turbine sleeve means bound to said shaft means in order to rotate therewith and impart rotational power to the shaft means.

36. The apparatus of claim 35 wherein said plurality of fin means is integrally bound to said turbine sleeve means and extends outwardly therefrom such that any given pair of fin means has a leading fin and a trailing fin when the turbine means rotates, the trailing fin of one given pair of fin means defines the leading fin of an immediate subsequent pair of fin means with respect to when the turbine means rotates.

37. An apparatus utilized in generating power comprising a base foundation means;
- a generally cylindrical container means comprising a container bottom having a facial plane that is angularly disposed with respect to a horizontal plane;
- a fluid means contained within said container means;
- a shaft means generally concentrically rotatably disposed in said cylindrical container means;
- a generally cylindrical turbine means bound to said shaft means and is angularly disposed with respect to a horizontal plane and rotatably within said container means having the fluid means, said turbine means including a turbine sleeve means bound to said shaft means in order to rotate therewith and impart rotational power to the shaft means, a plurality of fin means integrally bound to said turbine sleeve means and extending outwardly therefrom such that any given pair of fin means has a leading fin and a trailing fin when the turbine means rotates, the trailing fin of one given pair of fin means defines the leading fin of an immediate subsequent pair of fin means with respect to when the turbine means rotates;
- a generally cylindrical turbine cap means having a cap top that attaches to the turbine sleeve means, connects circumferentially around the shaft means, and attaches with and forms a seal with the top of each of the plurality of fin means, said turbine cap means additionally having a cap side integrally bound to said cap top and spacedly positioned away from the side of the cylindrical container means and connects with and forms a seal with the side of each of the plurality of fin means such that any given pair of fin means having its top and side respectively bound to the top and side of the turbine cap means defines a turbine compartment;
- each turbine compartment comprises a vent aperture; and
- a means for introducing compressed gas means through said container bottom in proximity to the lowest point of said turbine means with respect to a horizontal plane in order for the turbine means to rotate the shaft means when the compressed gas means produces a buoyancy force against the plurality of fin means and expands thereagainst as it rises from buoyancy to the surface of the fluid means causing the plurality of fin means to rotate with the expansion and buoyancy of the compressed gas means.

38. The apparatus of claim 37 wherein said vent aperture is disposed in the turbine side of each turbine compartment and in proximity to the top of a trailing fin of any given pair of fin means defining the side walls of a turbine compartment.

39. The apparatus of claim 38 wherein said container means additionally comprises a container top.

40. The apparatus of claim 39 wherein said container top has a facial plane that is angularly disposed with respect to a horizontal plane.

41. The apparatus of claim 40 wherein said container top has a container vent opening in proximity to its highest point with respect to a horizontal plane, and said shaft means extends through the container top.

42. The apparatus of claim 37 wherein each of said fin means is angularly disposed with respect to the longitudinal axis of the turbine sleeve means such that the bottom of each fin means is disposed ahead of its top as it rotates.

43. The apparatus of claim 37 wherein the bottom of each fin means and the bottom of said cap side are disposed off the bottom of said container means in order to allow the fluid means to communicate between the space between the cap side and the side of the container means and the space underneath the turbine cap means.

44. The apparatus of claim 41 additionally comprising a plurality of generally cylindrical vent conduits, each having a longitudinal axis and secured to a vent aperture such as to have its open end trailing the vent aperture.

45. The apparatus of claim 44 wherein said vent conduits are secured to said vent apertures such that the longitudinal axis of each of the vent conduits defines between about 0 to about 60 with the facial plane of said container top.

46. The apparatus of claim 41 wherein said facial planes of said container top and said container bottom are approximately between about 5 and 85 with a horizontal plane.

47. The apparatus of claim 37 additionally comprising an electric generator means mounted to and around said shaft means such that then said shaft means rotates the generator means can generate electricity.

48. The apparatus of claim 37 wherein said means for introducing compressed gas means through said container bottom comprises a compressor means for compressing gas means;

a storage means in communication with said compressor means for storing compressed gas means compressed by said compressor means; and a gas conduit means extending from said storage means through said container bottom in proximity to the lowest point thereof with respect to a horizontal plane in order to controllably emit compressed gas means into the bottom of the fluid means.

49. The apparatus of claim 41 additionally comprising an overflow conduit secured to the container top of said container means.

50. The apparatus of claim 37 wherein said turbine means rotates counter clockwise.

51. The apparatus of claim 44 wherein the longitudinal axis of each of the vent conduits defines with the facial plane of the container top about ½ of the number of degrees that the facial plane of the container top and container bottom define with a horizontal plane.

52. A process for revolving from a lower elevation to a higher elevation in a fluid means within a container means a plurality of fin means connected to a shaft means having a longitudinal axis that is less than normal with respect to a horizontal plane and wherein any given pair of fin means has a leading fin and a trailing fin and the trailing fin of one given pair of fin means defines the leading fin of an immediate subsequent pair of fin means with respect to when the plurality of fin means rotate, the process comprising the steps of:

(a) enclosing the plurality of fin means underneath a cap means having a cap top and a cap side by attaching to the cap top the top of each of the plurality of fin means and attaching to the cap side the side of each of the plurality of fin means such that any given pair of fin means having its tops and sides respectively bound to the top and side of the cap means defines a fin compartment;

(b) introducing compressed gas means into the fluid means in proximity to the lowest elevation of the pluralilty of fin means such that the compressed gas means impinges against the leading fin of the fin compartments in proximity to the lowest elevation and causes the fin compartments to start rotating toward the higher elevation as the compressed gas means produces a buoyancy force against the leading fin in rising from buoyancy to the surface of the fluid means; and (c) venting the compressed gas means, that has evolved from the surface of the fluid means in each fin compartment, from each fin compartment in order not to restrict or stop rotation of the revolving plurality of fin means in their downward path from the highest elevation to the lowest elevation.

53. The process of claim 52 wherein said compressed gas means is vented in proximity to the highest elevation of each fin compartment, and said shaft means is generally normal with respect to the bottom of the container means.

54. The process of claim 52 wherein said compressed gas means is vented when at least a portion of the inside of each fin compartment communicates with the atmosphere.

55. The process of claim 54 wherein said compressed gas means is vented from underneath the bottom of the cap side and the bottom of each of the plurality of fin means when respective fin compartments leave the fluid means.

56. The process of claim 53 wherein said venting step (c) is in proximity to the top of a trailing fin of any given pair of fin means.

57. The process of claim 56 wherein said venting step (c) is in proximity to the top of a trailing fin of any given pair of fin means and through a generally cylindrical vent conduit.

58. A process utilized in recovering energy and generating power by revolving from a lower elevation to a higher elevation in a fluid means within a container means a plurality of fin means connected to a sleeve means bound to a shaft means that is generally normal with respect to the facial plane of the top and bottom of the container means and having a longitudinal axis that is less than normal with respect to a horizontal plane, the process comprising the steps of:

(a) enclosing the plurality of fin means underneath a turbine cap means having a turbine cap top and a turbine cap side by attaching to the turbine cap top the top of each of the plurality of fin means and attaching to the turbine cap side the side of each of the plurality of fin means such that any given pair of fin means having its top and sides respectively bound to the top and side of the turbine cap means defines a turbine compartment with a leading fin and a trailing fin when the plurality of fin means rotate, the trailing fin of one given pair of fin means defines the leading fin of an immediate subsequent pair of fin means with respect to when the plurality of fin means rotate;

(b) mounting an electric generator means to and around said shaft means extending outside of said container means such that when said shaft means rotates the electric generator means can generate electricity;

(c) introducing compressed gas means into the fluid means in proximity the the lowest elevation of the plurality of fin means such that the compressed gas means produces a buoyancy force against the leading fin of the turbine compartments in proximity to the lowest elevation and causes the turbine compartments along with the shaft means and the connected sleeve means to rotate with the turbine compartments rotating from the lower elevation towards the higher elevation as the compressed gas means expand against the leading fin in rising from buoyancy to the surface of the fluid means; and (d) venting the compressed gas means, that has evolved from the surface of the fluid means in each turbine compartment, from each fin compartment in proximity to the highest elevation in order not to restrict or stop rotation of the revolving plurality of fin means in their downward path from the highest elevation to the lowest elevation and to continue the rotation of the sleeve means which causes the electric generator means to generate electricity for use.

59. The process of claim 58 wherein said venting step (d) is through the turbine cap side and in proximity to the top of a trailing fin of any given pair of fin means.

60. The process of claim 59 wherein said venting step (d) is through the turbine cap side of said turbine cap means and in proximity to the top of a trailing fin of any given pair of fin means and through a generally cylindrical vent conduit.

61. The process of claim 60 wherein said introducing step (c) of compressed gas means is from a storage means compressed gas means, and said process additionally comprising compressing gas means with a compressor means and introducing the compressed gas means into said storage means for storage and future use.

62. The process of claim 60 wherein said generally cylindrical vent conduit has a longitudinal axis defining with the facial plane of said turbine cap top about one-half of the number of degrees that the facial plane of the bottom and top of the container means define with a horizontal plane.

* * * * *